United States Patent
Wang et al.

(10) Patent No.: US 11,915,858 B2
(45) Date of Patent: Feb. 27, 2024

(54) INDUCTOR TEMPERATURE SENSOR

(71) Applicant: Ford Global Technologies, LLC, Dearborn, MI (US)

(72) Inventors: Fan Wang, Novi, MI (US); Serdar Yonak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 591 days.

(21) Appl. No.: 17/115,341

(22) Filed: Dec. 8, 2020

(65) Prior Publication Data
US 2022/0181076 A1    Jun. 9, 2022

(51) Int. Cl.
| | |
|---|---|
| *G01K 7/00* | (2006.01) |
| *H01F 27/40* | (2006.01) |
| *H01F 27/02* | (2006.01) |
| *H01F 27/28* | (2006.01) |

(52) U.S. Cl.
CPC ............ *H01F 27/402* (2013.01); *G01K 7/00* (2013.01); *H01F 27/025* (2013.01); *H01F 27/28* (2013.01); *H01F 2027/406* (2013.01)

(58) Field of Classification Search
CPC ...... H01F 27/402; H01F 27/025; H01F 27/28; H01F 2027/406; G01K 7/00
See application file for complete search history.

(56) References Cited

U.S. PATENT DOCUMENTS

| | | | | |
|---|---|---|---|---|
| 2,022,515 | A * | 11/1935 | Orchard ................. | G01K 13/00 374/208 |
| 3,500,273 | A * | 3/1970 | Heoll ..................... | H01F 41/04 29/605 |
| 3,709,678 | A * | 1/1973 | Helary ................... | C22B 5/06 75/707 |
| 3,784,868 | A * | 1/1974 | Shinkai .................. | H04N 9/29 361/150 |
| 6,257,758 | B1 * | 7/2001 | Culbertson ............ | G01K 7/02 374/E7.004 |
| 6,388,255 | B1 | 5/2002 | Di Maio et al. | |

(Continued)

FOREIGN PATENT DOCUMENTS

| | | | | |
|---|---|---|---|---|
| CA | | 3057900 A1 * | 10/2018 | ......... G01K 11/3206 |
| CN | | 103403820 B * | 4/2016 | ............ G05F 1/618 |

(Continued)

OTHER PUBLICATIONS

17115341_2023-10-18_CN_111316079_A_H.pdf,Jun. 2020.*
17115341_2023-10-18_DE_19604436_A1_H.pdf,Aug. 1997.*
17115341_2023-10-18_GB_1048025_A_H.pdf,Sep. 1966.*

*Primary Examiner* — Gail Kaplan Verbitsky
(74) *Attorney, Agent, or Firm* — David B. Kelley; Brooks Kushman P.C.

(57) ABSTRACT

A temperature sensor arrangement includes a housing having on opposite sides thereof a spring element and cover, and a temperature sensor lead and thermal pad such that the spring element is disposed between one of the sides and the cover, the temperature sensor lead is disposed between the other of the sides and the thermal pad, and the cover and thermal pad define opposite exterior sides of the temperature sensor arrangement. The housing carries and permits relative movement of the cover. The spring pushes the cover away from the one of the sides.

7 Claims, 5 Drawing Sheets

(56) References Cited

U.S. PATENT DOCUMENTS

| | | | | |
|---|---|---|---|---|
| 2002/0084884 A1 * | 7/2002 | Takahashi | ............... | G01K 7/22 |
| | | | | 374/E7.028 |
| 2015/0233604 A1 | 8/2015 | Gaspard | | |
| 2019/0297681 A1 | 9/2019 | Parachini et al. | | |
| 2020/0393306 A1 * | 12/2020 | Yoshihara | .............. | H02K 11/25 |

FOREIGN PATENT DOCUMENTS

| | | | | |
|---|---|---|---|---|
| CN | 205537490 U * | 8/2016 | | |
| CN | 111316079 A * | 6/2020 | ............... | G01K 1/08 |
| CN | 115602418 A * | 1/2023 | | |
| DE | 19604436 A1 * | 8/1997 | ........... | H05B 6/1254 |
| DE | 102016209459 A1 * | 11/2017 | | |
| EP | 3385962 A1 * | 10/2018 | ......... | G01K 11/3206 |
| GB | 1048025 A * | 9/1966 | | |
| GB | 2352563 A * | 1/2001 | ............... | A44C 5/00 |
| JP | 54121946 A * | 9/1979 | | |
| JP | S61219 U * | 1/1986 | | |
| JP | S61144603 U * | 9/1986 | | |
| JP | S6340771 U * | 3/1988 | | |
| WO | WO-2012114890 A1 * | 8/2012 | ............. | G05F 1/618 |

\* cited by examiner

INDUCTOR TEMPERATURE SENSOR

TECHNICAL FIELD

The present disclosure relates to the monitoring of a vehicle inductor.

BACKGROUND

A power inductor can be used in variable voltage converters (VVCs) to boost voltage in hybrid electric vehicles (HEVs). An inductor mainly includes a magnetic core and copper windings which have power losses that contribute to heat during operation. A built-in temperature sensor is used for real-time temperature monitoring and thermal management.

A VVC inductor can be liquid cooled through a cold plate, which is in contact with the inductor housing bottom surface. The potting material, e.g., epoxy resin, is applied between the inductor and housing to remove the air gap and therefore improve the cooling efficiency. A temperature sensor can be positioned between the two coils of windings, where the operating temperature is highest. During manufacturing, all inductor parts (core, windings, temperature sensor, and housing) are assembled together first, and then the potting material is applied. In this way, the temperature sensor is well fixed and protected by the potting. There is low cooling efficiency concerns for such conventional inductor designs due to the relatively long thermal path from the inductor core and top winding to the cold plate, as well as low thermal conductivity of the potting material.

Certain systems for monitoring temperature of an electrical power component use a bobbin to secure the temperature sensor in a position adjacent to a section of the power component. For example, a bobbin may be attached to either the set of windings or core, and the bobbin may have a section comprising the temperature sensor.

SUMMARY

A system for measuring temperature of a power electronic component includes an inductor having a first set of windings and a second set of windings opposite the first set of windings, a housing sized to fit between the first and second sets of windings and having a recessed first surface and a recessed second surface opposite the first surface, and a contact pad disposed within a cavity defined by the recessed first surface and defining a thermally conductive surface that thermally communicates with the first set of windings. The system further includes a sensor disposed between the contact pad and the recessed first surface, and in thermal communication with the contact pad such that the first set of windings are in thermal communication with the sensor, a cover sized to fit within a cavity defined by the recessed second surface, and between the second set of windings and the housing, and a first spring member disposed between the cover and the recessed second surface such that the first spring member applies a force to separate the cover and housing.

A temperature sensor arrangement includes a housing having on opposite sides thereof a spring element and cover, and a temperature sensor lead and thermal pad such that the spring element is disposed between one of the sides and the cover. The temperature sensor lead is disposed between the other of the sides and the thermal pad, and the cover and thermal pad define opposite exterior sides of the temperature sensor arrangement. The housing carries and permits relative movement of the cover. The spring pushes the cover away from the one of the sides.

An inductive element for an electric vehicle includes a ferromagnetic core disposed within first and second sets of electrically conductive windings such that the core facilitates magnetic flux between the first and second sets of windings when electrical current is in at least one of the first and second sets of windings, wherein the first set of windings is substantially opposite the second set of windings such that the first and second sets of windings form a gap sized such that a temperature sensor having a sensor housing, a spring biased cover, and a sensor fits within the gap.

DETAILED DESCRIPTION

Figure 1:
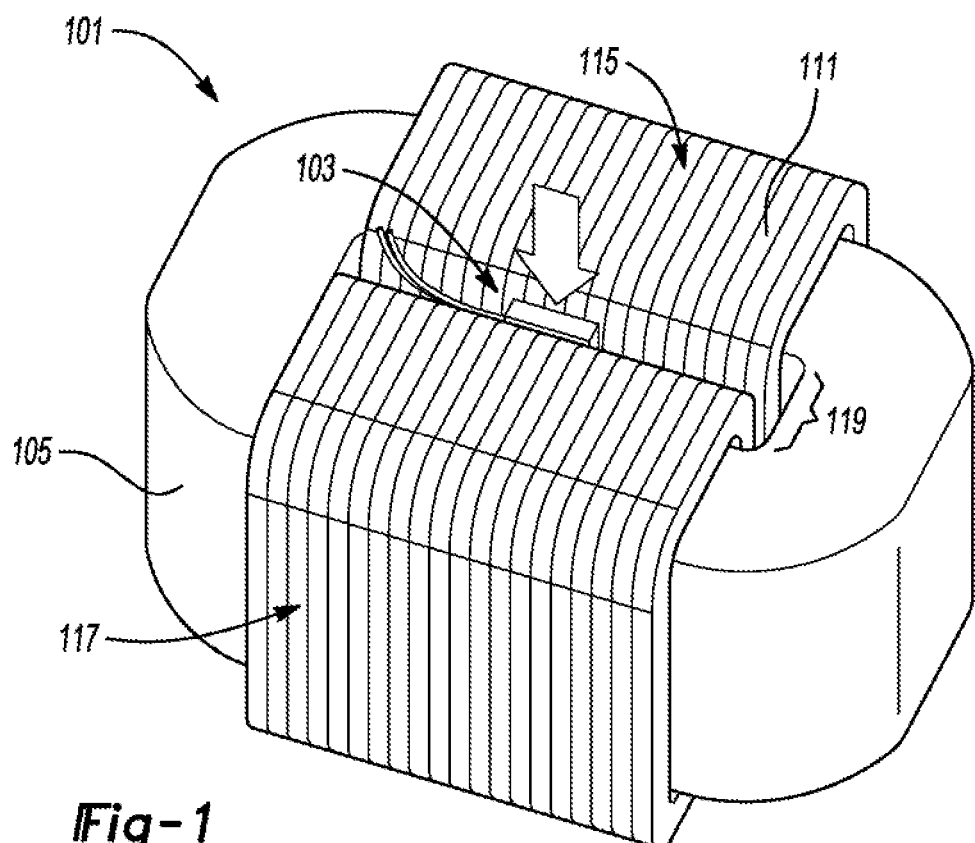
FIGS. 1 and 2 are perspective views of inductor assemblies.

As required, detailed embodiments are disclosed herein. It is to be understood, however, that the disclosed embodiments are merely exemplary—various and alternative forms are also contemplated. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

One way to enhance heat dissipation capability of an inductor is to have the inductor directly cooled by automatic transmission fluid (ATF). In one particular design, an inductor is placed within the transmission case, and ATF is splashed onto the inductor surface to cool down its temperature when the motor is running. For this direct oil cooling design, potting material is no longer needed. Without potting, the fixation of the temperature sensor becomes a challenge. One solution is to put the temperature sensor inside a dedicated housing, and injection mold the housing with the bobbin as a single part. This method, however, may have a disadvantage: The temperature sensor location is limited to the region very close to the bobbin at the coil end, which could be far away from the inductor hotspot during operation, especially for an inductor with great longitudinal length.

A vehicle may provide the environment for the sensors contemplated herein. The vehicle may include a power source in either electrical or mechanical communication with a drivetrain, such that the power source may be used to operate the drivetrain. The vehicle may further comprise wheels in one of electromagnetic and mechanical communication with the drivetrain such that the drivetrain may be used to propel the vehicle via the wheels.

The drivetrain may be partially operated by an electric power source. For example, the vehicle may include a traction battery used for operation of the drivetrain. Additionally, the drivetrain may be partially operated by an internal combustion power source such as an internal combustion engine. In embodiments containing both electrical and internal combustion power sources, the internal combustion power source may be in electrical communication with the electrical power source, such that power generated by the internal combustion power source may be used to charge the electrical power source. In such embodiments, the internal combustion power source may use electrical power components to facilitate conversion of combustion power to electrical power. For example, the internal combustion power source may be in mechanical communication with a generator. The generator may be in electrical communication with the electrical power source. In this configuration, the internal combustion power source may use combustion to operate the generator, thus charging the electrical power source.

The vehicle may comprise a traction battery. The vehicle may further comprise a high voltage electrical bus network (HV bus) and a low voltage electrical bus network (LV bus). The HV bus may be in electrical communication with the traction battery and other electrical power components. For example, the HV bus may be in electrical communication with power inverters. The LV bus may be in electrical communication with vehicle low voltage loads such as climate control, infotainment, etc. The HV bus may be in electrical communication with the LV bus via a converter. The converter may be used to match an electrical parameter between the HV bus and the LV bus. For example, the converter may be used to lower the voltage of electricity passing from the HV bus to the voltage of the LV bus. Similarly, the converter may be used to raise the voltage of electricity passing from the LV bus to the voltage of the HV bus. Alternatively, the converter may be used to reduce or increase the electrical current passing between the HV and LV bus networks to a desired value.

The vehicle may comprise a regenerative braking system. The regenerative braking system may be disposed within the wheels of the vehicle. The regenerative braking system may be in one of electromagnetic and mechanical communication with one of the drivetrain and the wheels. In embodiments wherein the regenerative braking system is in electromagnetic communication with one of the drivetrain and the wheels, the regenerative braking system may use magnetic resistance to provide negative torque to the wheels, such that the vehicle speed may be decreased by the regenerative braking system. Additionally, the regenerative braking system may use energy collected from the inertia of the vehicle to generate electrical power. Further, the regenerative braking system may be in electrical communication with an electrical power source and configured to provide electrical power to the electrical power source. For example, the regenerative braking system may be used to charge a vehicle battery. The regenerative braking system may include electrical power components to facilitate the transfer of inertial energy into electrical power configured for the electrical power source. For example, the regenerative braking system may use a generator to convert inertia into electrical power.

As discussed, the vehicle may comprise electrical power components such as convertors and generators. Further, the vehicle may comprise electrical power components such as inductors and transformers. Alternatively, electrical power components may include devices used for facilitation of electrical power that are not listed. One embodiment of a power electrical component may have a component housing, a set of windings, and a core. The embodiment may further comprise a cold plate. Additionally, the component may have a potting material. The windings may be disposed within the component housing. The windings may have a first set of loops directly opposite a second set of loops. The first set of loops may be electrically independent from the second set of loops, yet the first set of loops may be in magnetic communication with the second set of loops. The first set of loops may be spaced apart from the second set of loops such that the windings define a gap. The gap may extend along the first and second set of loops. The windings may be comprised of copper, aluminum, or other electrically conductive materials. In embodiments comprising a core, the core may be disposed within the windings, thus, the core may be disposed within the component housing. The core may form a ring. The core may be composed of a ferromagnetic material, such as iron, magnetic steel, or neodymium. The gap defined by the first and second set of loops of the windings may be disposed within the core. In embodiments comprising a cold plate, the cold plate may be used to remove heat from the electrical power component. As such, the cold plate may be in thermal communication with one of the housing, the windings, and the core. Further, the cold plate may be in thermal communication with vehicle coolant. The cold plate may have an inlet and outlet and supporting channels wherein vehicle coolant may flow throughout. As such, the vehicle coolant may be in thermal communication with the electrical power component via the cold plate, thus cooling the electrical power component. In embodiments comprising a potting material, the potting material may be disposed within the housing. The windings and the core may be disposed within the potting material. The potting material may be used to increase thermal communication within the electrical power component. As such, the potting material be in thermal communication with the windings, core, and housing of the electrical component, and in thermal communication with the cold plate. The potting material may be used to till a void containing a less thermal conduction composition of matter. For example, the potting material may be used to displace less thermal conducting air.

The vehicle may comprise a controller. The controller may be in electrical communication with one of a generator disposed between an internal combustion power source and an electrical power source, a converter disposed between a HV bus and a LV bus, and a generator between a regenerative braking system and a vehicle electrical network. Alternatively, the controller may be in electrical communication with unlisted electrical power components. The controller may allow or inhibit operation of the electrical power component based on the temperature value of the power component reaching a predetermined threshold. As such, the controller may be in electrical communication with a temperature sensor corresponding with the electrical power component.

The temperature sensor may comprise a sensor housing, a cover, a thermal contact pad, a spring, a sensor lead, a sensor wire, and a switch. The sensor housing may be sized to fit within the gap of the electrical power component. The housing may be comprised of a thermal resilient material. The sensor housing may define a recessed first area and a recessed second area. The recessed first area may be defined by a first perimeter. Similarly, the recessed second area may be defined by a second perimeter. The first perimeter may contain an opening such that the first perimeter is non-continuous. As such, the first area may be defined by a first perimeter including a notch. The second perimeter may be continuous. The sensor housing may define a third area adjacent to one of the first and second perimeters. The third area may define a housing surface. The housing surface may be comprised of a rough material. The housing surface may define a first plurality of gripping members. The first plurality of gripping members may be raised portions of the housing surface. The first plurality of gripping members may define a pattern. The gripping members of either the first plurality or the second plurality may be rectangular, triangular, curved, circular, oval, hexagonal, etc. The gripping members may further be defined as cooperating pointing shapes.

The thermal contact pad may be sized to fit within the first area of the sensor housing. As such, the thermal contact pad may be disposed within the first area of the sensor housing. When the thermal contact pad is disposed within the sensor housing, the thermal contact pad may be disposed within a gap defined by the windings. The thermal contact pad may be sized to have a thermal surface flush with the first perimeter. The contact pad may be composed of a thermally resistant material. Additionally, the thermal contact pad may be composed of thermally conductive material to facilitate accurate readings of the thermal parameters of the windings of the electrical power component.

The sensor lead may be sized to fit within the first area of the sensor housing. As such, the sensor lead may be disposed within the first area of the sensor housing. Further, the sensor lead may be disposed between the thermal pad and the sensor housing. The sensor lead may be in thermal communication with the thermal pad. Thus, the sensor lead may be in thermal communication with the windings of an electrical power component. The sensor lead may be in electrical communication with the controller via a sensor wire. The sensor wire may be connected to the sensor lead. The sensor wire may be disposed within the notch of the first perimeter.

The cover may be sized to fit within the second area of the sensor housing. As such, the cover may be disposed within the second area of the sensor housing. When the cover is disposed in the sensor housing, the cover may be disposed between the windings of the electrical power component. The cover may be comprised of a thermally resistant material, such that the cover is not plastically deformed due to thermal changes. The cover may be comprised of a rough material. The cover may define a cover surface. The cover surface may define a second plurality of gripping members. The second plurality of gripping members may be raised portions of the cover surface and configured to provide stronger grip onto adjacent surfaces than flat surfaces. The second plurality of griping members may be arranged to form a pattern. The pattern defined by the second plurality of gripping members may be different that the pattern defined by the first plurality of gripping members. The cover may be cooperable with a switch disposed on the sensor housing. The switch may move from a first position, locking the cover to the sensor housing, and a second position, allowing the cover to be removed from the sensor housing.

The spring may be sized to fit within the second area of the sensor housing. As such, the spring may be disposed within the sensor housing. Further, the spring may be disposed between the cover and the sensor housing. The spring may act to provide spring force upon the cover and the sensor housing, thus pressing the cover against an adjacent section of loops of the windings, and the remaining portion of the temperature sensor against the opposite section of loops of the windings. The spring force may be used to increase traction and friction forces holding the temperature sensor in place within the gap of the windings. The spring may be used to increase the coefficient of force between the cover and the adjacent section of loops. Further, the spring may be used to increase thermal communication between the opposite section of loops of the windings and the thermal pad. The spring may be a leaf spring. In such embodiments, the leaf spring may contain a single fold. In other embodiments, the leaf spring may comprise multiple folds. Alternatively, the spring may be a spring washer. Even further, the spring may be a coil spring. In some embodiments, the temperature sensor may contain a plurality of springs. In such embodiments, the temperature sensor may comprise at least one or a combination of a leaf spring, a spring washer, and a coil spring.

FIG. 1 illustrates a first embodiment of an inductor 101. The inductor 101 has a set of windings 111 and a core 105. The core 105 may be disposed within the set of windings 111. The set of windings 111 may have a first section of coils 115 and a second section of coils 117. The first section of coils 115 may be disposed on the core 105 such that the second section of coils 117 is opposite. The first section of coils 115 and the second section of coils 117 may form a gap 119. The inductor 101 further comprises temperature sensor 103. The temperature sensor 103 is sized to fit within the gap 119.

Figure 2:
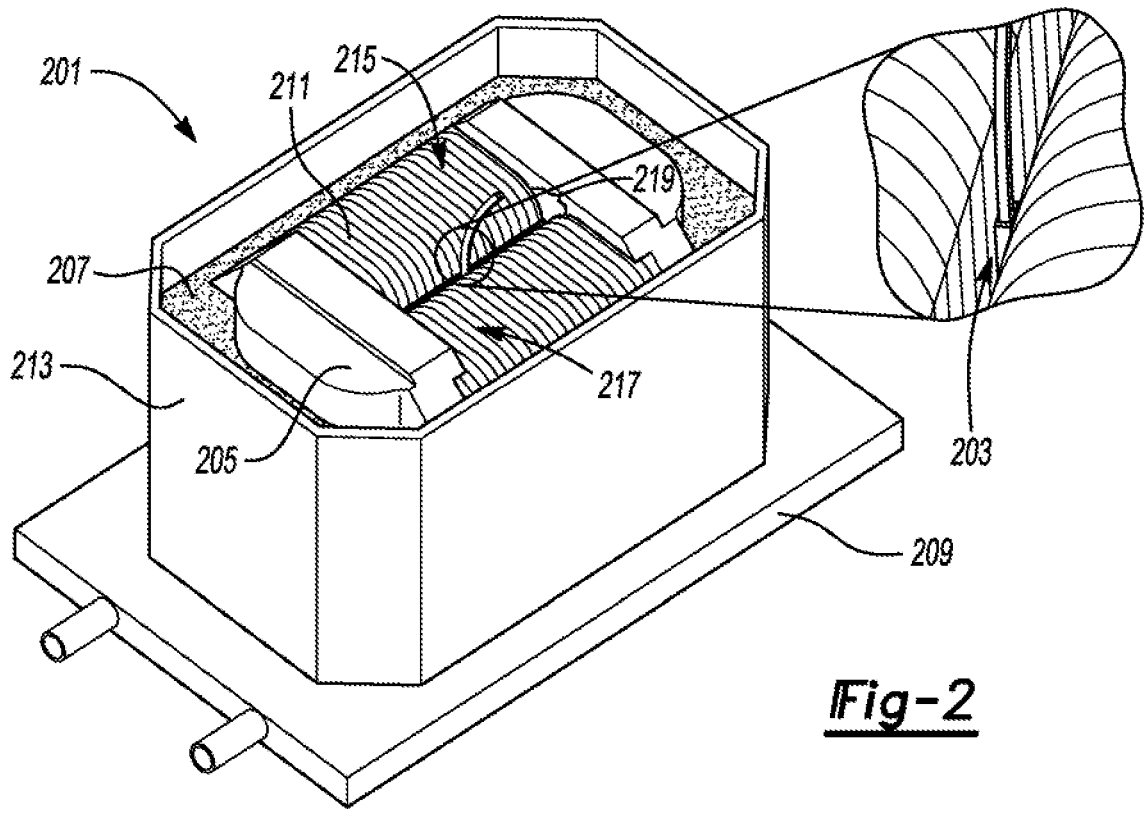

FIG. 2 illustrates a second embodiment of an inductor 201. The inductor 201 comprises a housing 213 and a cold plate 209. The inductor 201 has a set of windings 211, and a core 205. The windings 211 and core 205 are disposed within the housing 213. The core 205 may be disposed within the set of windings 211. The set of windings 211 may have a first section of coils 215 and a second section of coils 217. The first section of coils 215 may be disposed on the core 205 such that the second section of coils 217 is opposite. The first section of coils 215 and the second section of coils 217 may form a gap 219. The inductor 201 further comprises a temperature sensor 203. The temperature sensor 203 is sized to fit within the gap 219. The inductor 201 further comprises a potting substance 207. The potting substance 207 is in thermal communication with the core 205, the windings 211, and the housing 213. Further, the potting substance 207 is in thermal communication with the cold plate 209.

Figure 3A:
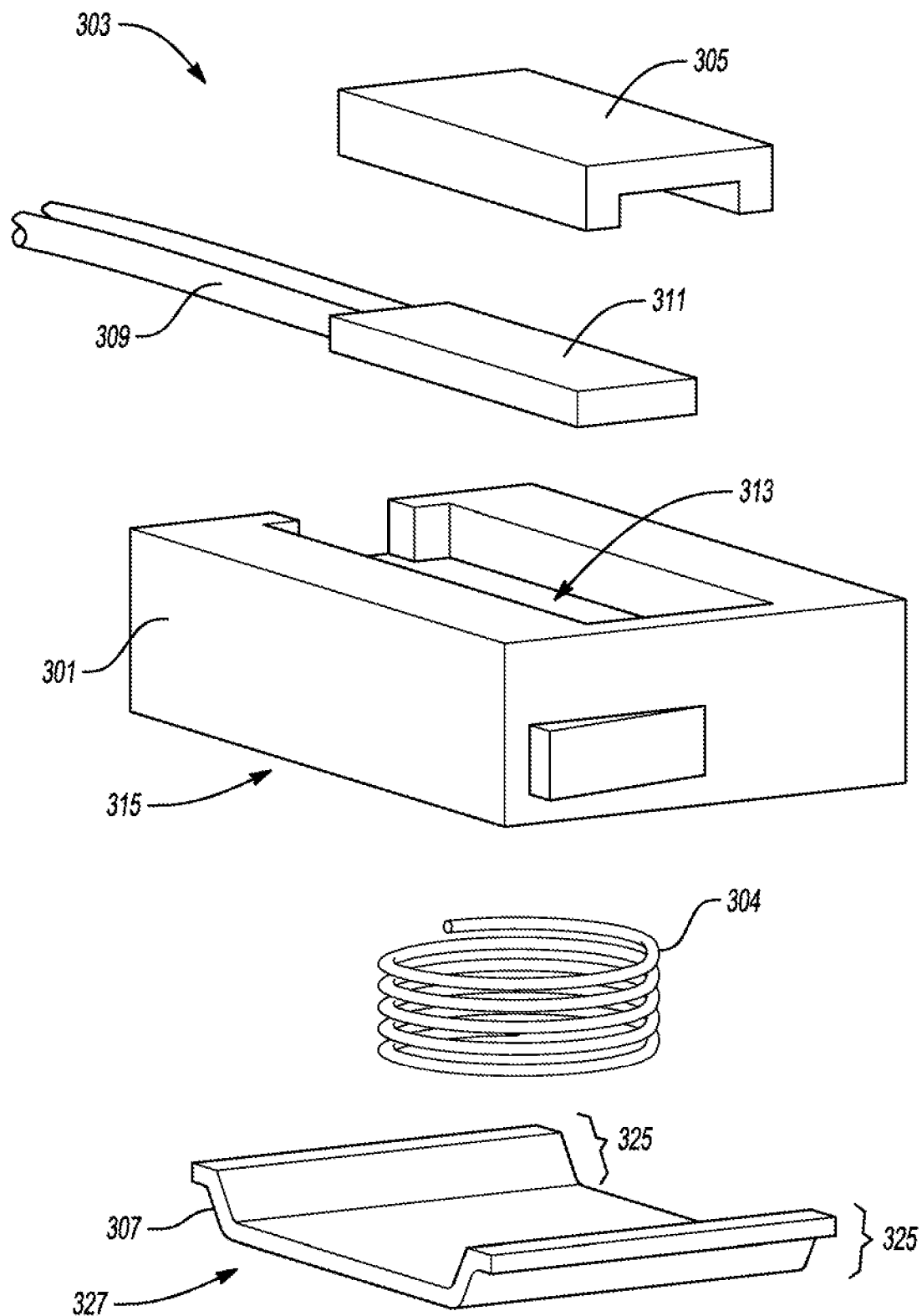
FIG. 3A is an exploded assembly view of a temperature sensor.
Figure 3B:
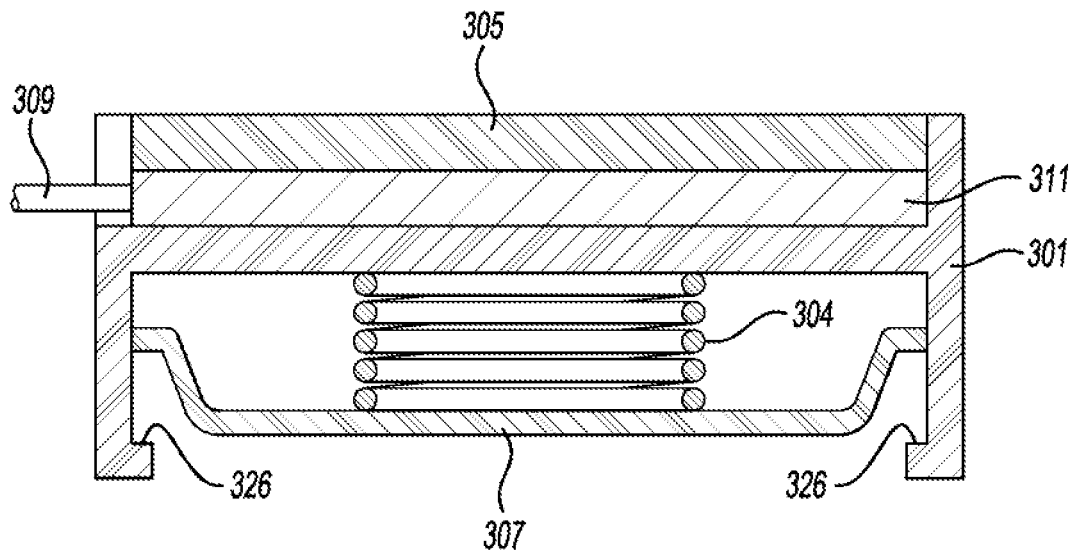
FIGS. 3B and 3C are side views, in cross-section, of the temperature sensor of FIG. 3A.
Figure 3C:
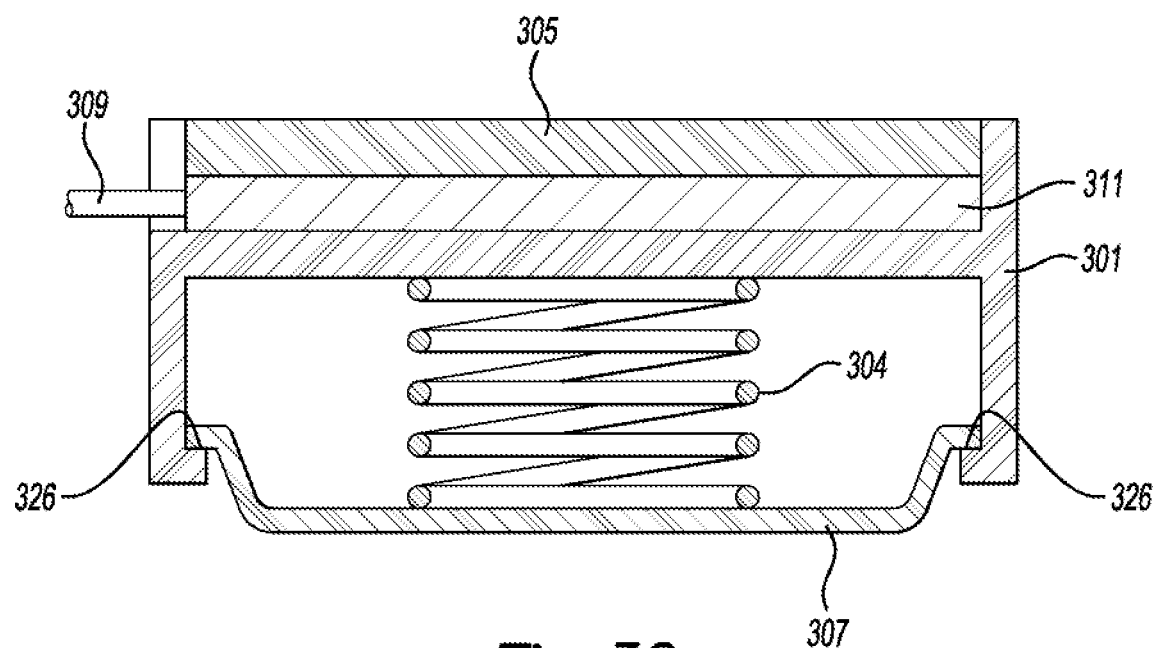

FIGS. 3A, 3B, and 3C illustrate a temperature sensor 303. The temperature sensor 303 comprises a sensor housing 301, a thermal pad 305, a spring 304, a sensor cover 307, a sensor wire 309, and a sensor 311. The sensor housing 301 has recessed surfaces 313, 315 on opposite sides thereof. The spring 304 is disposed within the cavity defined by the recessed surface 315 and between the sensor housing 301 and the sensor cover 307. The sensor cover 307, in this example, includes bent lip portions 325 that extend away from an outer surface 327 of the sensor cover 307 and towards the sensor housing 301. The bent lip portions 325 ride within and are retained by corresponding ledges 326 defined by the sensor housing 301 such that the outer surface 327 may move toward the sensor housing 301 and compress the spring 304 when the sensor 303 is being compressed (FIG. 3B), and the spring 304 may push the sensor cover 307 away from the sensor housing 301 when the sensor 303 is not being compressed, but the ledges 326 of the housing 301 limit such movement and ultimately retain the sensor cover 307 to the housing 301 (FIG. 3B). The sensor 311 is disposed within the cavity defined by the recessed surface 313 between the sensor housing 301 and the thermal pad 305. The thermal pad 305 is also disposed within the cavity defined by the recessed surface 313 such that an outer surface thereof is generally flush with the adjacent outer surface of the sensor housing 301. The thermal pad 305 and or sensor housing 301 may include known features (e.g., clips, interference fits, etc.) to retain the thermal pad 305 against the housing 301. The thermal pad 305 permits heat from windings in contact with the thermal pad 305 to transfer therethrough so that the sensor 311 may detect a corresponding temperature. The sensor 311 provides a signal to the sensor wire 309 indicative of the temperature of the windings. The sensor wire 309 is in communication with a controller.

Figure 4:
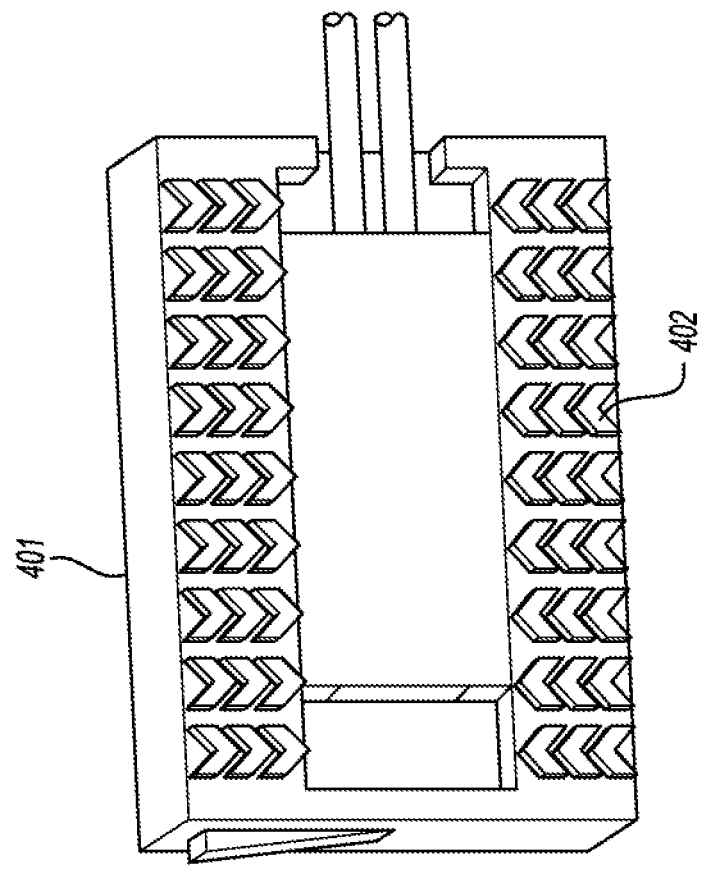
FIG. 4 is a perspective view of portions of a temperature sensor.
Figure 4:
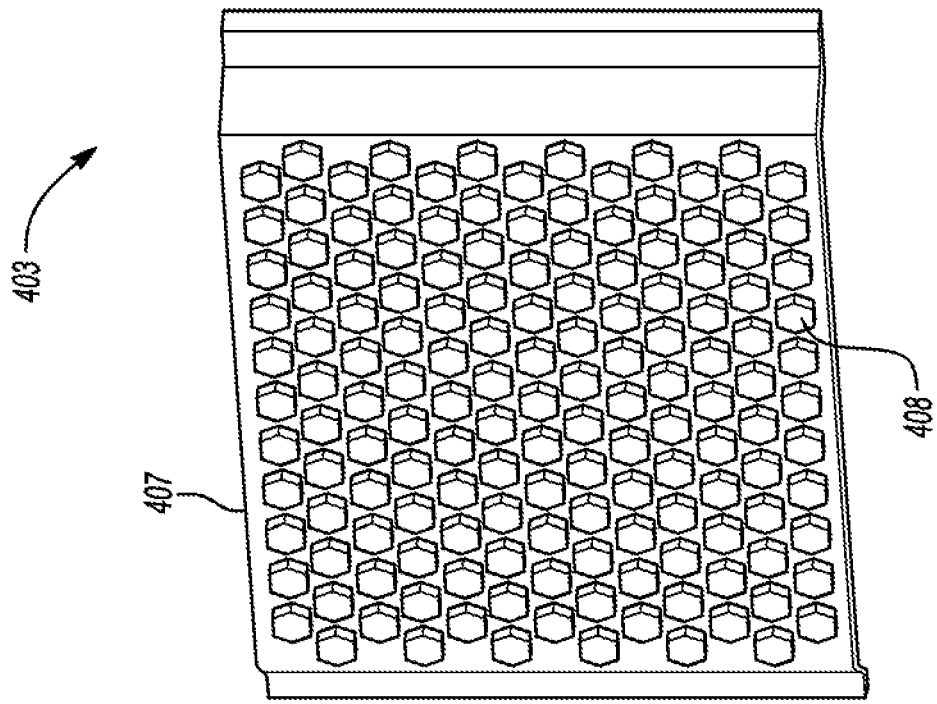

FIG. 4 illustrates a temperature sensor 403 having a sensor cover 407 with rough features 408 and a sensor housing 401 with rough features 402 Both of the rough features 402, 408 comprise a plurality of raised members. The rough features 402 are arrow-like raised members. The rough features 408 are cylinder-like raised members. Other raised members are also contemplated.

Figure 5:
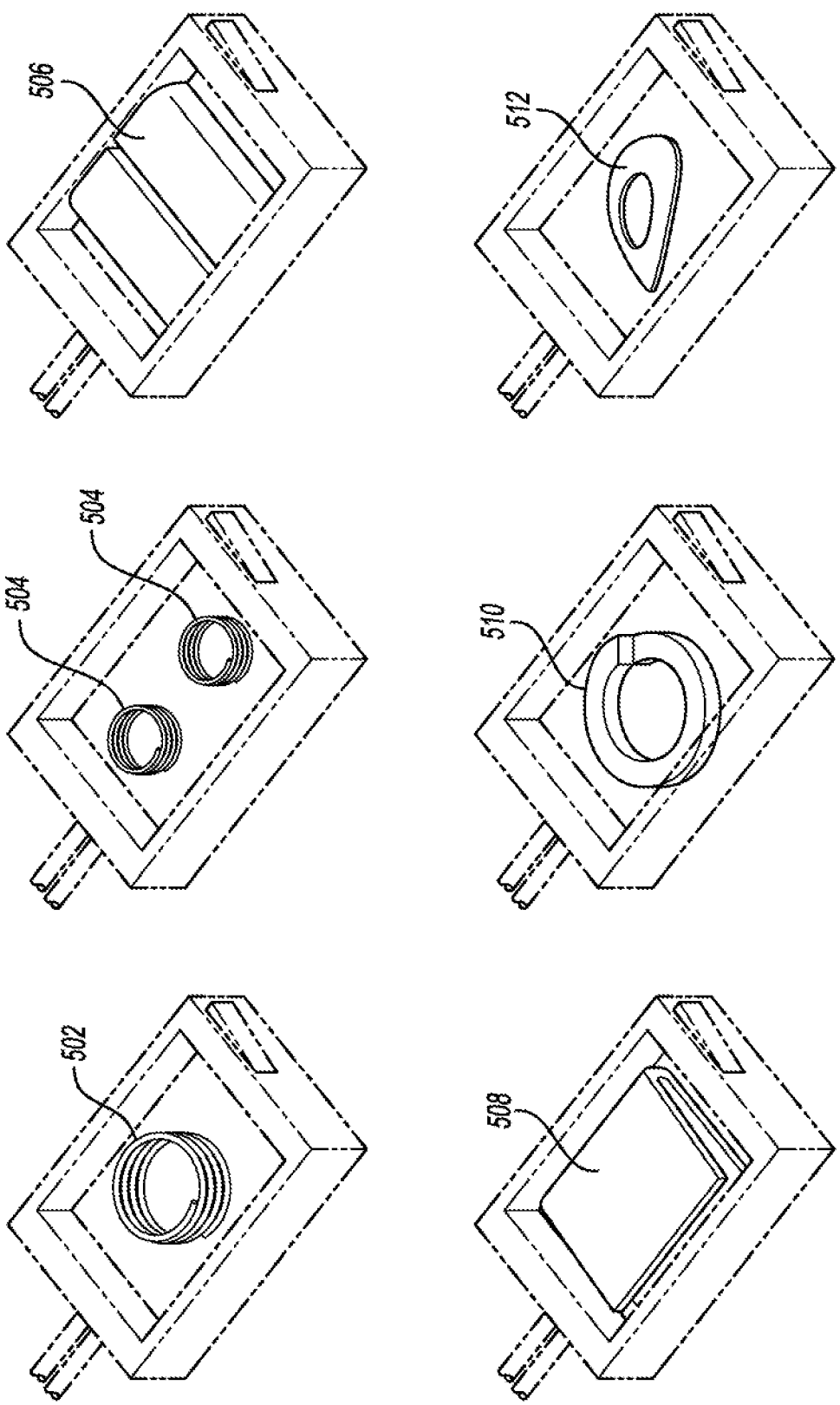
FIG. 5 is a perspective view various spring mechanisms.

FIG. 5 illustrates various spring mechanisms for temperature sensors. The spring mechanism may be a single spring 502 or dual coil spring 504, a double-fold leaf spring 506, a single-fold leaf spring 508, a washer spring 510, or a bend spring 512.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system for measuring temperature of a power electronic component, comprising:
    an inductor having a first set of windings and a second set of windings opposite the first set of windings;
    a housing, sized to fit between the first and second sets of windings, having a recessed first surface and a recessed second surface opposite the first surface;
    a contact pad disposed within a cavity defined by the recessed first surface and having a thermally conductive surface configured to thermally communicate with the first set of windings;
    a sensor disposed between the contact pad and the recessed first surface, and in thermal communication with the contact pad such that the first set of windings are in thermal communication with the sensor;
    a cover sized to fit within a cavity defined by the recessed second surface, and between the second set of windings and the housing; and
    a first spring member disposed between the cover and the recessed second surface such that the first spring member applies a force to separate the cover and housing.

2. The system of claim 1, wherein the cover further defines a rough surface configured to engage windings of an inductor adjacent to the cover.

3. The system of claim 1 further comprising a second spring member disposed within the cavity defined by the recessed second surface and between the cover and the recessed second surface such that the second spring cooperates with the first spring to apply a force to separate the cover and housing.

4. The system of claim 1, wherein the first spring member is a spring.

5. The system of claim 1, wherein the first spring member is a spring washer.

6. The system of claim 1, wherein the first spring member is a folded leaf spring defining a single fold.

7. The system of claim 1, wherein the first spring member is a folded leaf spring defining a plurality of folds.

* * * * *